Feb. 11, 1930. J. S. PRICKITT Re. 17,588

HOLDER FOR MEMORANDUM PADS

Original Filed Sept. 27, 1924 2 Sheets-Sheet 1

INVENTOR
JOSHUA SPENCER PRICKITT
BY Geo. E. Wheelock
ATTORNEY

Feb. 11, 1930. J. S. PRICKITT Re. 17,588

HOLDER FOR MEMORANDUM PADS

Original Filed Sept. 27, 1924 2 Sheets-Sheet 2

INVENTOR
JOSHUA SPENCER PRICKITT
BY Geo. S. Wheelock
ATTORNEY

Reissued Feb. 11, 1930 Re. 17,588

UNITED STATES PATENT OFFICE

JOSHUA SPENCER PRICKITT, OF NEW YORK, N. Y.

HOLDER FOR MEMORANDUM PADS

Original No. 1,611,676, dated December 21, 1926, Serial No. 740,206, filed September 27, 1924. Application for reissue filed December 20, 1928. Serial No. 327,424.

This invention relates generally to memorandum pads and more particularly to holders for supporting said pads. In the pads commonly in use, the pad which comprises a plurality of sheets is clamped to its base along its top edge or along one of its side edges leaving the remainder of the pad, except such edge, clear for writing memoranda thereon. This does not imply that certain features of the present invention are not applicable to such pads. There are no divisions on the sheets of such pads for separating data concerning different subjects matter about which it is often necessary to make a record. When data concerning a particular subject matter is already recorded on such sheets, and it becomes necessary through a hurried telephone call or otherwise to record data concerning a different subject matter, in order to effectively separate the data concerning the different subjects matter, recourse is usually had to creasing the sheet and recording the data concerning the second subject matter below the crease. Again, recourse is often had to folding the sheet on which the data is already recorded and turning it back in order to present a fresh sheet. These expedients consume time, waste considerable paper and necessitates the use of both hands which at certain times especially when answering a telephone is objectionable. Furthermore, when the supply of sheets of such pads is exhausted, the holder is usually thrown away. In the ordinary pad, when a number of sheets has been torn off, a considerable quantity of waste paper is left under the clamping and cutting portion of the holder which makes the cutting of the sheets remaining on the pad a difficult and ineffective operation.

It is a feature of the present invention to provide a pad holder whereby the pad may be so positioned thereon that two writing sheets for recording memoranda concerning different subjects matter are available or can readily be made available, either of which sheets may be used for recording data of a permanent nature which does not need immediate attention, permitting said sheet to remain intact on the holder, while the other sheet may be used for recording data that has to be passed along for immediate attention necessitating the immediate tearing off of the sheet. Thus the holder serves a double purpose.

Another feature is the provision of a holder that can utilize pads made from scrap paper found in the office, or other sources, and one that can readily be adjusted to different sizes of pads.

A further feature is the provision of means for readily removing the waste paper from the holder.

A further feature is the provision of a holder that is permanent in character and pleasing in appearance.

The invention accordingly consists in the features of construction, combination of elements and arrangement of parts which will be exemplified in the construction hereinafter set forth as the preferred embodiment, and the scope of the application of which will be indicated in the following claims.

In the accompanying drawings forming a part of this specification wherein similar reference characters refer to similar parts throughout the several views, Figure 1 is a perspective view of the improved holder.

Figure 1:
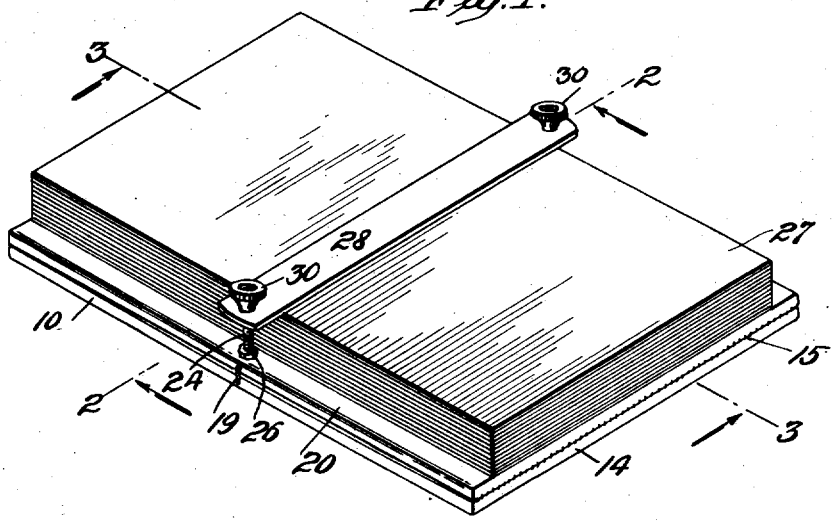
Figure 2:
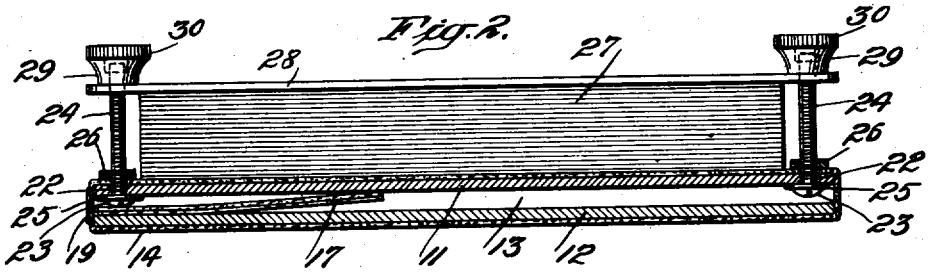
Figure 2 is a section view taken on the plane indicated by the line 2—2 of Figure 1 and looking in the direction of the arrows.
Figure 3:
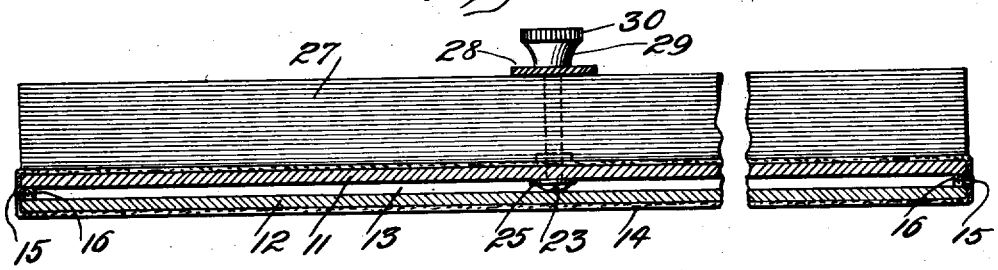
Figure 3 is a sectional view taken on the plane indicated by the line 3—3 of Figure 1 and looking in the direction of the arrows.
Figure 4:
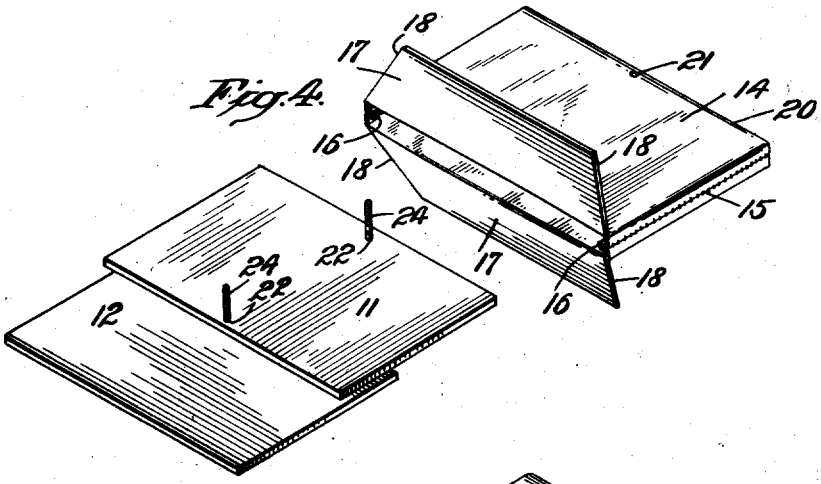
Figures 4, 5 and 6 are detail views, showing the preferred method of making the pad.
Figure 5:
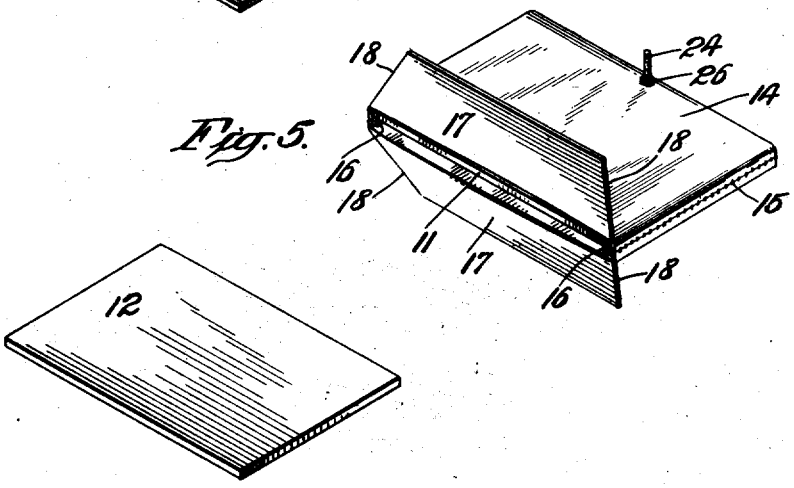
Figure 6:
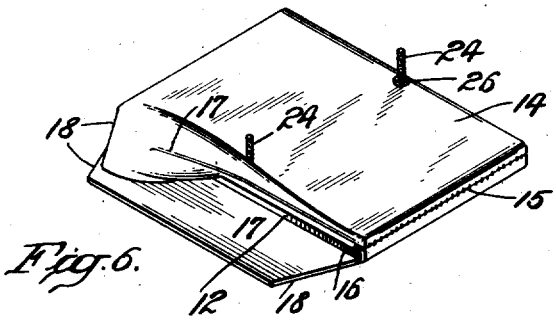

Referring to the drawings, the base indicated generally as 10 is substantially rectangular in shape and comprises an upper strip 11 of cardboard and a lower strip 12 of the same material, so positioned with respect to each other that a space 13 is provided therebetween. Covering both of these strips and engaging them snugly is a cover or pocket 14, which cover is preferably made of heavy felt to protect the surface supporting the base from being scratched or otherwise damaged. Cover 14 also serves another useful purpose hereinafter referred to. This cover 14 is made from a single piece of sheet material. A row of stitching 15 at the top and the bottom of said cover 14, when the base 10 is in effective position, closes the cover at these points and forms an inwardly projecting seam 16. These seams 16 serve to keep the strips 11 and 12 in spaced relationship. One side of said cover 14 is formed with flap portions 17, the end edges 18 of which are cut at an angle. These flap portions 17 are turned in and are disposed in the space 13 as will be seen from Figure 2. The cover 14 is closed at this side by a stitch 19. The upper surface 20 of the cover 14 has oppositely disposed openings 21. The upper strip 11 of cardboard is also provided with oppositely disposed openings 22. When the cardboard strip 11 and the cover 14 are in effective position, the openings 21 and 22 are in alignment. Passing through said aligned openings 21 and 22 are screws 23, the shanks 24 of which extend upwardly above the cover 14. In order to prevent the screws 23 from moving relatively to the cardboard strip 11 and cover 14, washers 25 are disposed between the lower surface of the strip 11 and the heads of the screws 23, and lock nuts 26 are mounted on the shanks 24 and engage the upper surface 20 of the cover 14. It will be observed from Figures 2 and 3 that the heads of the screws 23 and the washers 25 are disposed in the space 13 between the upper and lower strips 11 and 12 respectively. Screw shanks 24 with heads are desirable, whether or not washers are used, and as the cardboard or filler which is within the cover is preferably of paper, each screw-head and lock nut 26, which firmly press in opposite directions upon the portion of cardboard or filler immediately surrounding the small hole through which the screw passes, clinch such portion tightly between them, so that the screws are firmly and rigidly supported as posts extending from the cardboard or filler and through the cover, corresponding portions of which are preferably also clinched underneath the lock nuts 26. When the cardboard or equivalent flat members 11, 12 are of non-metallic paper material it is probably necessary that the apertures in the base be so small that the posts will just pass through them, for if larger in any part thereof there is danger of the head of the screw squeezing out through the material or of the material being squeezed out from between the head of the post and its anchoring nut, so that the post will not be rigidly supported, if at all.

For clamping the pad 27, which comprises a plurality of sheets of paper, removably on the base 10, a thin flat steel bar 28 is provided. This bar 28 has an opening at each end through which the shanks 24 of the screws 23 pass. This construction enables the bar 28 to be moved up and down along the shanks 24. In order to hold the bar 28 firmly and removably against the pad 27, nuts 29 are mounted on the shanks 24, which nuts have interiorly threaded bores therethrough, the threads of said bores being adapted to engage the threads on the shanks 24. Said nuts 29 also have notched portions 30 for the convenient turning of the same. It will be observed that by reason of this construction, the bar 28 is constantly held in firm and adjustable engagement with the pad 27 and may be readily removed for the purpose of removing any waste paper that might accumulate thereunder.

In use, the pad 27 which may be of any desired size is positioned on the base 10 between the shanks 24 and adjusted so that the center of the pad will lie directly underneath the bar 28. The bar 28, it will be observed, acts as a holding device and cutting device and at the same time divides the pad into two writing surfaces or sheets, a surface on either side of said bar. Memoranda which require immediate attention may be written on the sheet on one side of the bar and said sheet immediately torn off, while memoranda which do not require immediate attention may be written on the sheet on the other side of the bar, which sheet may be left on the pad. If the writing surfaces on both sides of the bar contain memoranda, and it becomes necessary to write further data concerning another subject matter, either of the surfaces or sheets may readily be cut from the pad by reason of the bar 28 having cutting edges on both sides. Whenever it becomes necessary to remove the waste which accumulates under the bar 28 from the cutting operations, all that it is necessary to do is to loosen the nuts 29 and lift the bar 28. The bar 28 can again be brought into firm engagement with the pad 27 by settitng up the nuts 29. Of course, the bar 28 and its accessories may be differently located, as, for example, at one end of the pad.

Referring now to the fact that cover 14 encloses a filler preferably including two filler members of cardboard or the like, the novelty in this connection will be pointed out. So far as I am aware, I am the first to disclose such a combination for providing a base for a memorandum pad, especially where rigid screw-posts or the like extend from the non-metallic filler. By the use of two flat filler members it is possible to so cover the same as to hide the edges of the flexible covering material which is preferably in one piece. When the flexible covering material is in one piece, the practice of this portion of my invention enables the manufacturer to thus hide all seams or unsightly joints at the edges of the material, by virtue of the fact that the edges of the material are turned inwardly and disposed between the adjacent edges of the two filler members. A number of incidental advantages flow from the practice of this principle of the invention, such as that an entirely covered filler may be obtained, providing a non-scratching or defacing base which is substantially smooth on both opposite surfaces of the base except for those elements which are exposed and are obviously desirable for obtaining the rigidity of the posts; and also there is provided a tight cover made of flexible material which extends neatly and smoothly over the edges of the two filler members, partly because the edges of the covering material are unexposed. The preferred cover in one piece is such that it extends around and between coinciding edges of the flat filler members at one edge of the base, while at the three remaining edges of the base, if it be rectangular, joints appear, but these joints are sightly and unobjectionable when the just described principle of the invention is utilized.

In one aspect of the invention the flat member 12 or the like may be considered to be sheet material extending under the base member 11 and covering it on the bottom, suitable means being provided to secure it cooperatively with the member 11. Likewise, it is obvious that the posts 24 may extend through both flat members 11, 12, to secure them together. The device is preferably provided with soft material at the underside of the base to prevent easy slippage on the smooth hard surface of a desk.

I will now describe the preferred method of making the improved holder.

To make the improved holder, the cover which has previously been provided with the seams 16 is turned inside out and the upper cardboard strip 11 which has previously been provided with the oppositely disposed holes 22 is placed on top of said cover 14 for the purpose of marking the exact points on the upper portion 20 that have to be perforated. The upper portion 20 is then perforated at the points marked. The cover 14 is then turned back to its normal position with the seams 16 on the inside. The strip 11 is then inserted into open end of the cover 14, the end edges of said strip 11 adjacent the seams 16 riding over the upper surface of said seams 16 and being guided in their movement thereby. This strip 11 when it is inserted into the cover 14 preferably carries on the end thereof first inserted in the pocket one of the screws 23 with the washer 25, the upstanding shank 24 of which screw rides in alignment with the opening 21 adjacent the bottom edge thereof and is passed through the said opening 21 in the surface 20 of cover 14, the flexible character of the cover 14 permitting this passage of the shank 24 because said cover can be stretched open. The other screw 23 is then passed through the other oppositely disposed aligned openings 22 and 21 in the strip 11 and cover 14, respectively. The lower cardboard strip 12 is then inserted in the cover 14, the side edges of said strip riding underneath the side seams 16 and being guided thereby in their movement. When these strips 11 and 12 thus driven home, the seams 16 lie in between them and sharp, smooth and even corners result. The lock nuts 26 are then mounted on the shanks 24 and brought into engagement with the upper surface 20 of the cover 14. Next the flaps 17 are turned in between the strips 11 and 12 and the stitch 19 is provided to close the base at this point. The pad 27 is next placed in its proper position on the base and the bar 28 placed over the shanks 24. Thereafter the nuts 29 are mounted on said shanks 24 and brought into engagement with the bar 28 in order to removably and adjustably hold said bar 28 on the pad 27. It is obvious that due to the preferred construction explained, the base members 11, 12 are held against separation in the practical use of the pad and are kept intact after the holder has been properly made.

Variations may be resorted to within the scope of the invention and portions of the improvements may be used without others.

I claim:

1. A holder for a memorandum pad comprising an elongated base formed of an upper and a lower strip of cardboard spaced from each other and a felt cover therefor, said cover having oppositely disposed seams adapted to extend in the space between said cardboard strips and adapted to guide said strips upon their insertion into said cover, a bar mounted removably on said base for clamping said pad thereon, said bar being so disposed on said base that said pad may be positioned on said base to present a writing surface on either side of said bar, said bar having a cutting edge on either side whereby either of said writing surfaces may be severed from the pad, and means for adjusting said bar vertically.

2. A holder for a memorandum pad comprising an elongated base formed of an upper and a lower strip of cardboard spaced from each other and a felt cover therefor, said cover having oppositely disposed seams adapted to keep said cardboard strips in spaced relationship, a bar mounted removably on said base intermediate the ends of said base for clamping said pad thereon whereby a writing surface is presented on either side of said bar, said bar having a cutting edge on either side whereby either of said writing surfaces may be severed from the pad, and nuts adapted to engage said bar to hold the latter adjustably and removably on the base.

3. A holder for a memorandum pad comprising an elongated base formed of an upper and a lower strip of cardboard spaced apart from each other and a felt cover therefor, said cover having oppositely disposed seams adapted to keep said strips in spaced relationship, screws passing through said upper cardboard strip and cover at opposite sides of said strip and extending above said cover, the heads of said screws being positioned in the space between said cardboard strips, a bar mounted on the upward extensions of said screws for clamping said pad on the base and nuts carried by said screws above said bar and adapted to engage said bar to adjust said bar with respect to said base and removably hold said bar firmly against the pad.

4. The herein described method of making a holder which consists in forming a cover of felt including an open side with flaps, inwardly projecting seams on the top and bottom ends and oppositely disposed openings in its upper surface, inserting a strip of cardboard into said cover above said seams, said strip carrying a pair of screws, the seams acting as a guide during said insertion and permitting flexure of the felt to accommodate the screw, next passing screws through said opening in the cover, the shanks thereof extending upwardly above the cover, said screws carrying washers adjacent their heads, next mounting lock nuts on said shanks above said cover, next inserting a second strip of cardboard into said cover below the seams, the seams acting as a guide during said insertion, next tucking the flaps of said cover in between said cardboard strips, thereafter closing the open side of said cover by stitching the upper and lower surfaces of the cover, thereafter mounting a flat bar having cutting edges on either side on said upwardly extending screws and thereafter mounting set screws above said bar to removably and adjustably hold said bar in position.

5. As an article of manufacture, a base for a memorandum pad comprising a lower and an upper strip of cardboard spaced from each other, said upper strip having a pair of openings, a felt cover adapted to snugly engage said strips, said cover having a pair of openings in alignment with the openings in said upper strip, an inwardly extending seam on each side of said cover, said seams disposed between said strips of cardboard to hold said strips in spaced relationship, a pair of screws passing upwardly through the openings in said upper strip and said cover, the heads of said screws disposed between said cardboard strips and the shanks thereof extending upwardly above said cover and a bar mounted removably on said upwardly extending shanks to clamp the pad on said cover.

6. In a device of the character described, a base including a substantially rectangular and relatively thin filler member provided with apertures adjacent its side edges, a covering of sheet material on said rectangular member, the covering for the upper side being correspondingly apertured, a pair of screw-threaded posts extending upwardly through said apertures in the filler member and covering, each of said screw-threaded posts having an enlarged head engaging the lower side of said filler member and concealed by the covering on the lower side, anchoring nuts cooperating with said screw-threaded posts and against the upper side of said base, whereby to firmly hold said posts in upright position, a flat clamping bar extending between said posts and adapted to overlie a plurality of paper sheets constituting a memorandum pad, and adjusting nuts on the outer ends of said posts for engaging the clamping bar to force it toward the base.

7. In a device of the character described, a base including a substantially rectangular and relatively thin filler member provided with apertures adjacent its side edges, a covering of sheet material on said rectangular member, a pair of screw-threaded posts extending upwardly through said apertures in the filler member, each of said screw-threaded posts having an enlarged head engaging the lower side of said filler member and concealed by the covering on the lower side, anchoring nuts cooperating with said screw threaded posts and against the upper side of said base, whereby to firmly hold said posts in upright position, a flat clamping bar extending between said posts and adapted to overlie a plurality of paper sheets constituting a memorandum pad, and adjusting nuts on the outer ends of said posts for engaging the clamping bar to force it toward the base.

8. In a device of the character described, a base including a flat member provided with apertures adjacent opposite edges, and also a covering of non-metallic sheet material extending underneath the flat member, a pair of screw-threaded posts extending upwardly through the apertures, each of the posts having a head located below the flat member, anchoring nuts on the posts, set against the upper side of said base, and cooperating with the heads to firmly hold the posts upright on the flat member, a clamping bar extending between the posts and adapted to overlie and secure paper sheets constituting a memorandum pad, and adjusting nuts screwed on the posts for forcing the clamping bar toward the base.

9. In a device of the character described, a base including a flat member of non-metallic material provided with apertures adjacent opposite edges, and also a covering of non-metallic sheet material extending underneath the flat member, a pair of screw-threaded posts extending upwardly through the apertures, each of the posts having a head located below the flat member, anchoring nuts on the posts, set against the upper side of said base, and cooperating with the heads to firmly hold the posts upright on the flat member, a clamping bar extending between the posts and adapted to overlie and secure paper sheets constituting a memorandum pad, and adjusting nuts screwed on the posts for forcing the clamping bar toward the base.

10. In a device of the character described, a pad-base, comprising two flat members held inseparably face to face and having substantially coinciding edges, a sheet of non-metallic material covering the bottom member and the edges of both members, edges of the sheet material being turned in between the edges of the members, and being hidden between the inseparable members.

11. In a device of the character described, a pad-base, comprising two flat members having substantially coinciding edges all around, a single sheet of non-metallic material covering the outer surfaces of the members and having its edges turned over, and in between, certain edges of the members, and means for maintaining the flat members face to face, in inseparable relationship.

12. In a device of the character described, a pad-base, comprising two flat members having substantially coinciding edges all around, a single sheet of non-metallic material covering the outer surfaces of the members and having its edges turned over, and in between, certain edges of the members, and means for securing some of the opposed turned-in edges together whereby to provide closed joints.

13. In a device of the character described, a pad-base, comprising two flat members held inseparably face to face and having substantially coinciding edges, a sheet of non-metallic material covering the bottom member and the edges of both members, edges of the sheet material being turned in between the edges of the members, and being hidden between the inseparable members, posts anchored rigidly in the material of the base, and means for securing the pad in using position in relation to the posts.

14. In a device of the character described, a pad-base, comprising two flat members having substantially coinciding edges all around, a single sheet of non-metallic material covering the outer surfaces of the members and having its edges turned over, and in between, certain edges of the members, and means for maintaining the flat members face to face, in inseparable relationship, and pad securing means anchored rigidly in the material of the base and protruding at the anchorage through the non-metallic covering material.

JOSHUA SPENCER PRICKITT.